United States Patent

Tagawa

[11] Patent Number: 5,991,773
[45] Date of Patent: Nov. 23, 1999

[54] INFORMATION TERMINAL UNIT WITH HISTORY MANAGEMENT FUNCTIONS

[75] Inventor: Norio Tagawa, Nagoya, Japan

[73] Assignee: Brother Kogyo Kabushiki Kaisha, Nagoya, Japan

[21] Appl. No.: 08/848,194

[22] Filed: Apr. 29, 1997

[30] Foreign Application Priority Data

Apr. 30, 1996 [JP] Japan .................................... 8-109653

[51] Int. Cl.[6] .................................................. G06F 17/30
[52] U.S. Cl. .............................. 707/203; 707/10; 707/2; 395/705
[58] Field of Search .................................. 707/104, 103, 707/203, 10, 513, 102, 205, 2; 345/333; 395/200, 705

[56] References Cited

U.S. PATENT DOCUMENTS

| | | | |
|---|---|---|---|
| 4,907,188 | 3/1990 | Suzuki et al. | 395/200 |
| 5,519,865 | 5/1996 | Kondo et al. | 707/2 |
| 5,659,735 | 8/1997 | Parrish et al. | 707/10 |
| 5,678,042 | 10/1997 | Pisello et al. | 707/203 |
| 5,778,231 | 7/1998 | Van Hoff et al. | 395/705 |
| 5,802,299 | 9/1998 | Logan et al. | 395/200 |

*Primary Examiner*—Wayne Amsbury
*Assistant Examiner*—Thu-Thao Havan
*Attorney, Agent, or Firm*—Oliff & Berridge, PLC

[57] ABSTRACT

An information terminal unit with history management functions, wherein the user clicks on previous and later history buttons using a mouse. Clicking a history button causes a URL assigned with a version number to be created. The URL is sent to a relay server, which searches its cache for the requested data and, if the requested version is found, transfers that data back to the information terminal unit. This provides the user with a feasible method to access past data that may no longer exist in the desirable form.

12 Claims, 13 Drawing Sheets

HARDWARE STRUCTURE OF THE RELAY SERVER

HARDWARE STRUCTURE OF THE TERMINAL UNITS

```
<H1>SAMPLE</H1>

A <A HREF="http://www.abc.net/index.html">
HYPERLINK</A>
IS HERE.<P>

<IMG SRC="star.gif">
```

[FUNCTIONS OF THE RELAY SERVER]

[FUNCTIONS OF THE TERMINAL UNITS]

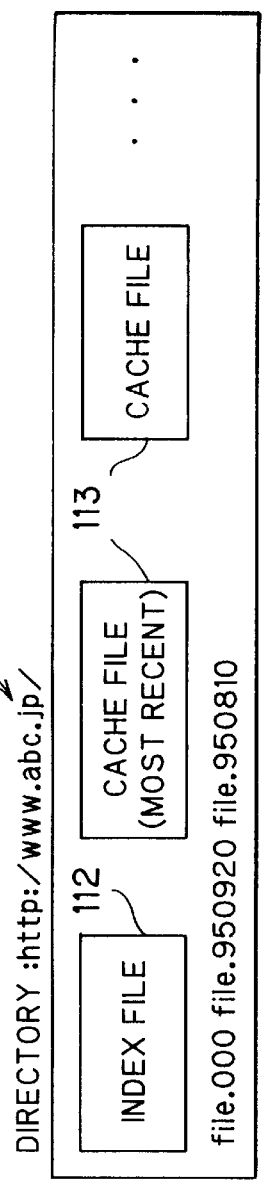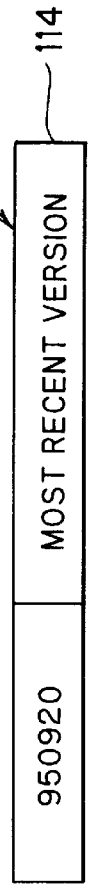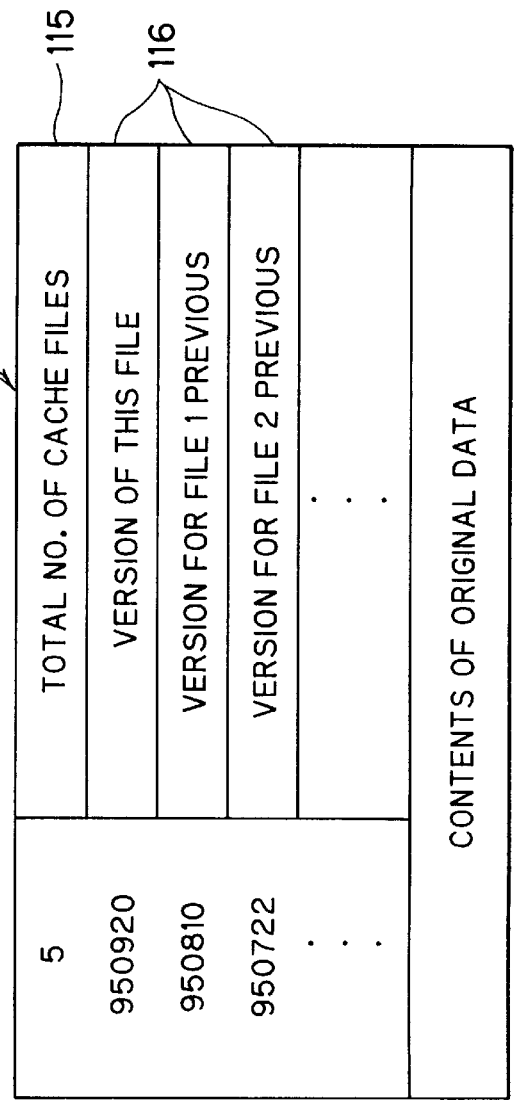
FIG. 11(a)
FIG. 11(b)
FIG. 11(c)

RELATIONSHIP OF LINKS

CACHE DATA

INFORMATION TERMINAL UNIT WITH HISTORY MANAGEMENT FUNCTIONS

BACKGROUND OF THE INVENTION

1. Field of the Invention

The present invention relates to database technology and an information terminal unit with history management functions for searching for or acquiring data particularly from information providers, which are connected to each other via a network and configured as a distributed database system.

2. Description of the Prior Art

Conventional distributed database systems use the Internet via a plurality of information providers (servers). Most servers distributed throughout a database structure called the World Wide Web (WWW) on the Internet provide their own individual data that users on the information terminal unit end obtain when the need arises.

Servers scattered throughout this WWW are linked together to form a distributed database using a mechanism called hyperlinks. Hyperlinks use indexes called uniform resource locators (URLs), contained in one data, or location, of the database, to point to other data in the database. Users follow these indexes to semi-automatically move to other servers and obtain data from those servers.

These URLs are basically name references and do not themselves contain the essential content of the data pointed to by the hyperlinks. Therefore, the existence of a hyperlink does not necessarily guarantee the existence of the actual data to which the hyperlink points.

Further, a feature of the distributed database system on the Internet is that the processing is not consistent throughout, but rather separate and individual processing is performed for each server. In general, the processes for creating links and for preparing data are different. In such a database system, specific data corresponding to a hyperlink will not always exist even if the hyperlink has been created.

Hence, users of the database service have only been able to search or acquire data that is available at the time of use, because the servers used to provide the data service are not all consistent in processing. For example, data that could be found or acquired in the past is sometimes altered at another point in time. When this happens, a user wanting to search or acquire that past data cannot, but can now only access the current altered data.

Since this past data cannot be accessed when the need arises, the user could save data onto a local disk while the data is still accessible, when the user thinks that data might be useful in the future.

However, it is not feasible for all users to save all the data they will need, and a large memory capacity would be necessary to store all that data. Further, if a large amount of data is saved, much labor would be required to process that data, determining which data are necessary for the user.

SUMMARY OF THE INVENTION

In view of the foregoing, it is an object of the present invention to provide an information terminal unit for storing in a storing means data acquired from information providing means, allowing past data to be searched for and acquired according to the user's specifications.

To achieve the above and other objects, there is provided, as shown in FIG. 1, an information management terminal unit connectable to a system wherein a plurality of information providing means are connected to one another via a network, thereby configuring a distributed database system. The information management terminal unit includes communicating means, history management mans, storing means, screen generating means, displaying means, and history specifying means. The communicating means is provided for communicating with the plurality of information providing means via the network and acquiring data therefrom. The history management means manages, on a time basis, the data acquired from the information providing means. The storing means stores the data acquired from the plurality of information providing means. The screen generating means generates screen information based on the data received from the historly management means. The displaying means displays an image screen based on the screen Information generated by the screen generating means. The history specifying means is provided for specifying history information in the history managing means.

According to the information terminal unit of the present invention, any one of the plurality of information providing means, with which a distributed database system is configured, is accessible with the communicating means via the network and data in a desired information providing means can be searched for and acquired. The history management means manages, on a time basis, plural pieces of data acquired from the information providing means through the communicating means. The plural pieces of data are stored in the storing means and the screen generating means generates screen information based thereon. A screen image is generated based on the screen information and is displayed on the displaying means. With such an arrangement, the data acquired from the information providing means and also the data stored in the storing means can be displayed on the displaying means.

Because past data can be specified by the history specifying means, a user can easily obtain the past data only by operating the history specifying means.

The history management means adds coded information to the data acquired from the plurality of information providing means to provide coded information added data and stores the coded information added data in the storing means. The coded information identifies one of the plurality or information providing means from which the data is acquired. Because coded information is added to the data acquired from the information providing means and the resulting data is stored in the storing means, search for a desired data can be easily implemented.

Plural sets of screen generating means, displaying means, and the history specifying means may be provided to one set of the history management means and the storing means. By such a configuration, a number of users can share the single storing means and so it is advantageous in conserving memory capacity.

According to another aspect of the invention, there is provided a method of acquiring data from a plurality of information providers connected to one another via a network. First, a uniform resource locator is entered from one of a plurality of information terminal units connectable to the network to acquire data identified by the uniform resource locator from one of the plurality of information providers. The uniform resource locator includes a directory name and a file name. The data acquired from the information provider is stored in a directory of a cache memory. The directory is named to correspond to the uniform resource locator. The data stored therein is assigned with a file name and a version of the data. The data is transferred to any information terminal unit which searches for the data, and the data is displayed in a display unit provided in association with the information terminal unit when the data identified by the uniform resource locator is stored in the cache memory.

The uniform resource locator further includes a version. The file name further includes a flag indicating that the version of the data is added. Preferably, the version is given by a number corresponding to year/month/date at a time when the uniform resource locator is entered.

Whether or not the data identified by the uniform resource locator is updated is investigated in the information provider when the uniform resource locator is later entered from one of the information terminal units. When the data identified by the uniform resource locator is not updated, the data is transferred to the information terminal unit which searches for the data from the cache memory. When the data identified by the uniform resource locator is updated, updated data is stored in the directory of the cache memory. The updated data stored therein is assigned with a file name and a new version.

A desired version of the data can be entered when the data corresponding to the desired version is to be displayed in the display unit.

The data contains another uniform resource locator identifying correlated data. The another uniform resource locator includes a directory name and a file name. Another uniform resource locator is entered from the information terminal unit to acquire the correlated data identified by the another uniform resource locator from one of the information providers. The correlated data is also stored in a directory with the directory name of the another uniform resource locator of the cache memory. The correlated data stored therein is also assigned with a file name and a version of the data. The correlated data is transferred to any one of the information terminal units which searches for the correlated data. The correlated data can also be displayed in the display unit of the corresponding information terminal unit when the correlated data identified by the another uniform resource locator is stored in the cache memory.

Typically, the information terminal unit is connected to a local area network. The plurality of information providers are connected to a wide area network. The local area network is connected to the wide area network. Preferably, a relay server is connected to the local area network and the cache memory is provided in the relay server. The relay server acts as a server with respect to the information terminal unit on the local area network and as a client with respect to the plurality of information providers on the wide area network.

BRIEF DESCRIPTION OF THE DRAWINGS

The particular features and advantages of the invention as well as other objects will become apparent from the following description taken in connection with the accompanying drawings, in which:

FIG. 11(a) is an explanatory diagram showing the structure of cache data;

FIG. 11(b) is an explanatory diagram showing the structure of index file;

FIG. 11(c) is an explanatory diagram showing the structure of cache file;

DETAILED DESCRIPTION OF THE PREFERRED EMBODIMENT

A preferred embodiment of the present invention will be described while referring to the accompanying drawings.

Figure 1:
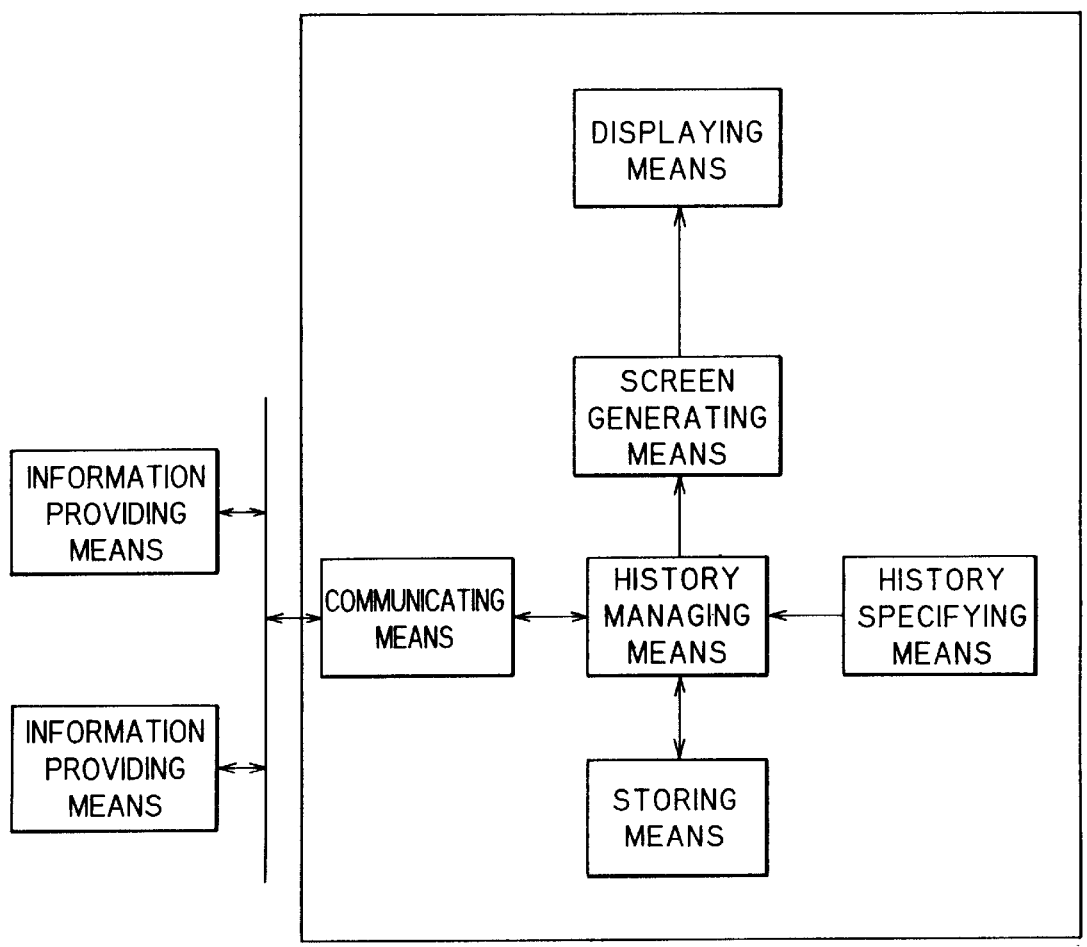
FIG. 1 is an explanatory diagram showing an example structure of the present invention.
Figure 2:
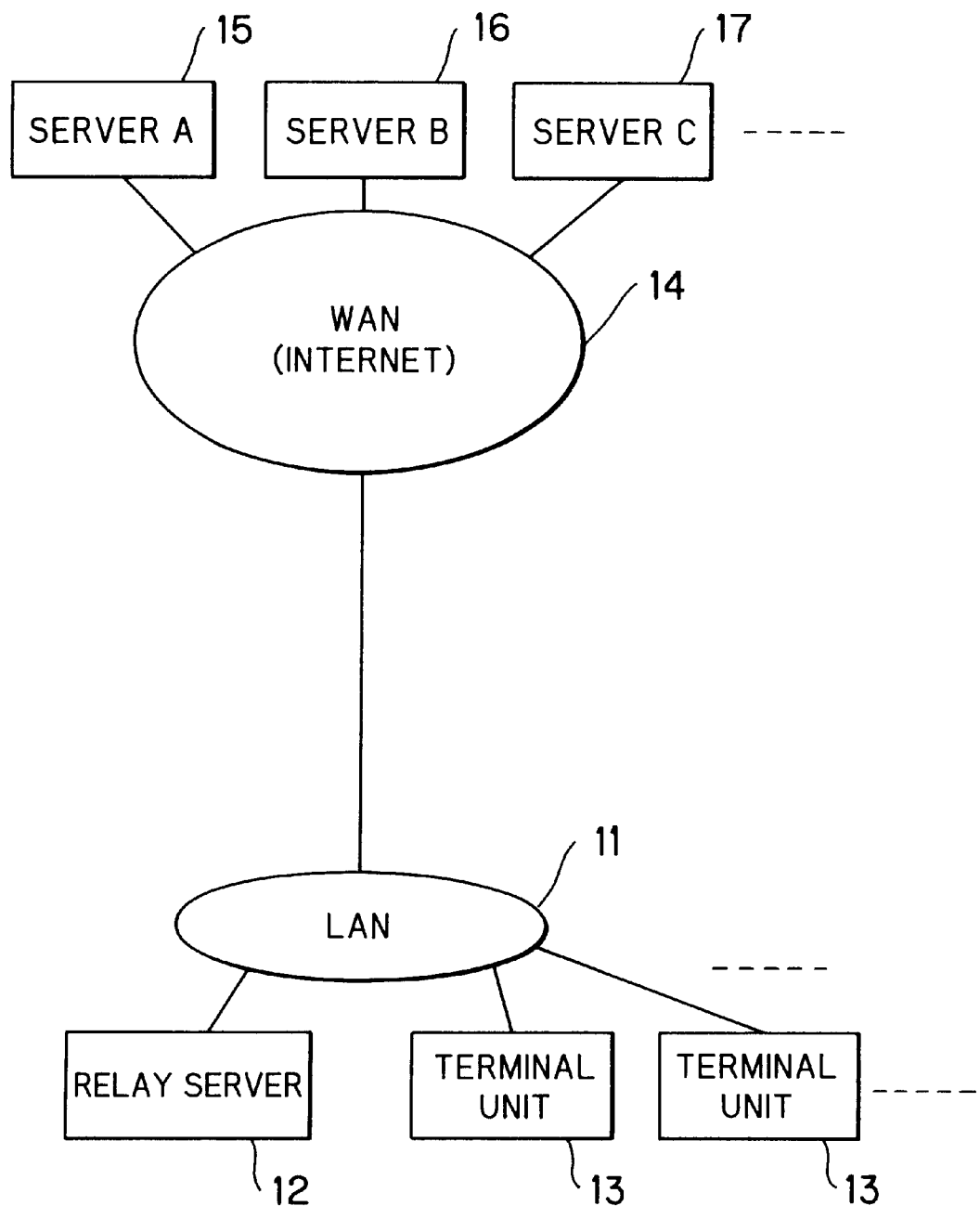
FIG. 2 is a block diagram of a network using information terminal units of the embodiment with history management functions.

Information terminal units according to the embodiment are provided with a history management function and used in a network system shown in FIG. 2. This network is configured by connecting local area networks (LAN) 11 to a wide area network (WAN) 14 as represented by the Internet. Terminal units 13 for the users and a relay server 12 are connected to the LAN 11. In the embodiment, an information terminal unit having a history management function is configured by any one of the terminal units 13 and the relay server 12. Servers A, B and C denoted by reference numerals 15, 16 and 17, respectively, serve as information providers. Those servers and many WWW servers are connected to the WAN 14 to form a distributed database.

Figure 3A:
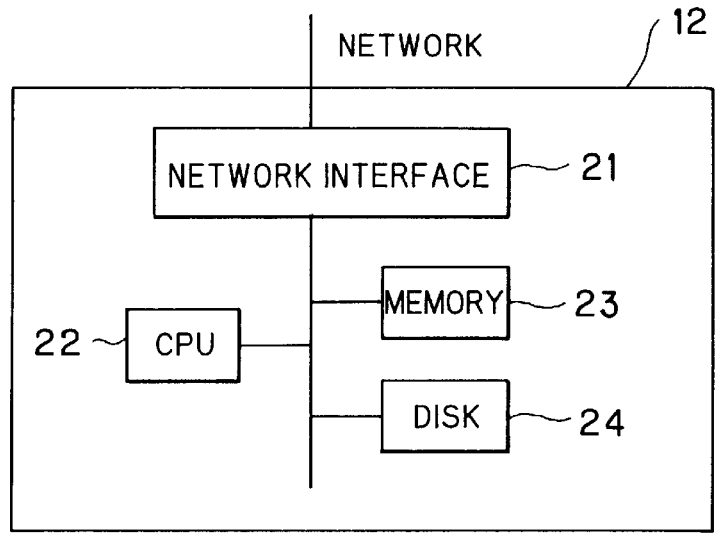
FIG. 3(a) is a block diagram showing a hardware structure of a relay server used in the embodiment.
Figure 3B:
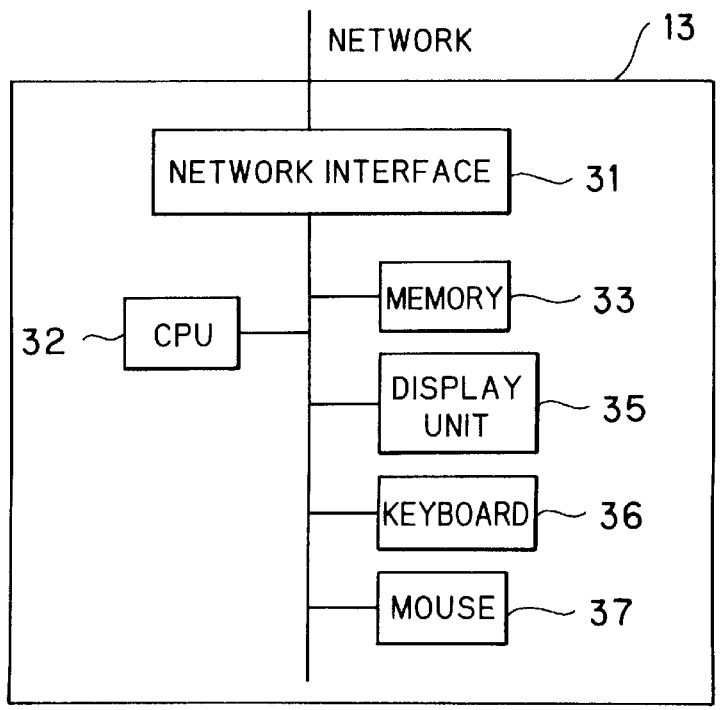
FIG. 3(b) is a block diagram showing a hardware structure of a terminal unit used in the embodiment.

A hardware arrangement of the network will be described. Generally, the LAN 11 employs high speed communication lines, such as an Ethernet, whereas the WAN 14 employs relatively low speed but long distance communication lines, such as telephone lines. While various kinds of equipment are usable for the relay server 12 and the terminal units 13, the present embodiment uses personal computers therefor as shown in FIG. 3. Briefly, as shown in FIG. 3(a), the relay server 12 includes a network interface 21 serving as a communication means, a central processing unit (CPU) 22 serving as a control means, a memory 23 serving as a storage means, and a disk 24 also serving as a storage means. On the other hand, as shown in FIG. 3(b), the terminal unit 13 includes a network interface 31 serving as a communication means, a CPU 32 serving as a control means, a memory 33 serving as storage leans, a display unit 35 serving as a display means, a keyboard 36 serving as an input means, and a mouse 37 also serving as an input means.

Operation of the WWW system in this network will be briefly described.

The network uses TCP/IP (transmission control protocol/ internet protocol) as a communication protocol. This TCP/IP allows communications to be performed between any of the units on the network. Hence, the terminal unit 13 is capable of directly communicating with the server A (15), server B (16), and server C (17) on the internet. The WWW system performs data communications primarily with the HTTP protocol. Although other protocols are usable, the embodiment employs only the HTTP protocol which operates as an upper significant protocol with respect to the TCP/IP protocol. The HTTP protocol is relatively simple. Whenever a command is received from a client or terminal unit, the server responds, transferring one piece of data each time. For example, assume that the terminal unit 13 sends a command "GET/index.html" to the server A (15). This command requests that the file "index.html" on the server A (15) be transferred to the terminal 13. In response to this command, the server A (15) transmits the corresponding file, i.e., "index.html," to the terminal unit 13.

Figures 4, 5:
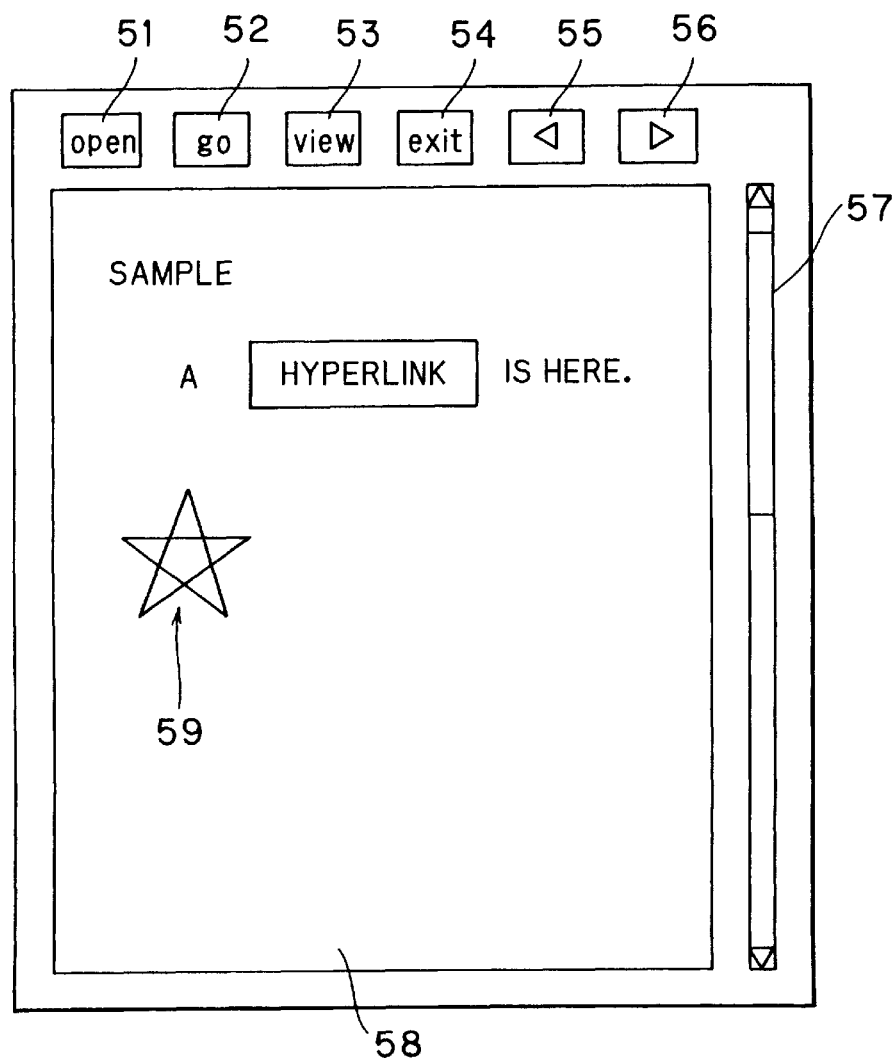
FIG. 4 is an explanatory diagram showing a sample HTML file.
FIG. 5 is an explanatory diagram showing a sample display.

The HTTP protocol determines the data transfer method. The contents of the data are written with hyper text markup language (HTML). FIG. 4 shows a page written with HTML. In HTML, messages and commands are written in a text format. In FIG. 4, a portion inserted between "<" and ">" indicates a command. FIG. 5 shows an entire image displayed on the display unit 35 of the terminal. unit 14 (see FIG. 3(b)) corresponding to the HTML indicated in FIG. 4.

An "open" button 51, "go" button 52, "view" button 53, "exit" button 54 and history buttons 55 and 56 are provided in the upper portion of the display. Clicking these buttons with the mouse 37 (see FIG. 3(b)) causes the corresponding operations to be performed. The history buttons 55 and 56 are used to trace the history and extract past data. When the left history button 55 is clicked, the previous version can be displayed whereas when the right history button 55 is clicked, the following new version is displayed.

A scroll bar 57 is located at the right side of the display shown in FIG. 5. In the central portion of the display is located a main window in which actual data is displayed. Referring back to FIG. 4, "SAMPLE," sandwiched between "<H1>" and "</H1>," indicates a header whose characters are of a larger size than the other displayed characters. The line <IMG SRC="star.gif" > in FIG. 4 corresponds to the star symbol 59 in the main window 58 shown in FIG. 5, and is a command to display an image file named "star.gif". Therefore, a file containing this symbol is transferred separately using the HTTP protocol and put on the window.

The lines "A HREF="http://www.abc.net/index.html"> Hyperlink</A>" describes a characteristic hyperlink in the WWW system. When the text portion between "<A. . . > and </A> is clicked by the mouse 37, the data designated by "HREF=. . . " can be read, causing users to feel as if they have traveled from one server to another.

Figure 6:
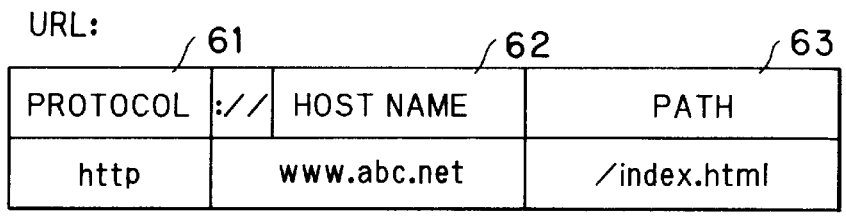
FIG. 6 is an explanatory diagram showing a URL.

The link indicated in "HREF= . . . " is described in the form of a URL. A URL includes a protocol name 61, a host name 62, and a path name (file name) 63, as shown in FIG. 6. The protocol name is HTTP. The host name specifies a certain server on the TCP/IP network. The path name specifies a file on that server.

In general, the servers in the WWW system simply send data specified by the terminal units 13, while the display and linking processes are performed in the terminal units 13. An outline of the process described above as seen from the terminal units 13 is shown in FIG. 7.

Figure 7:
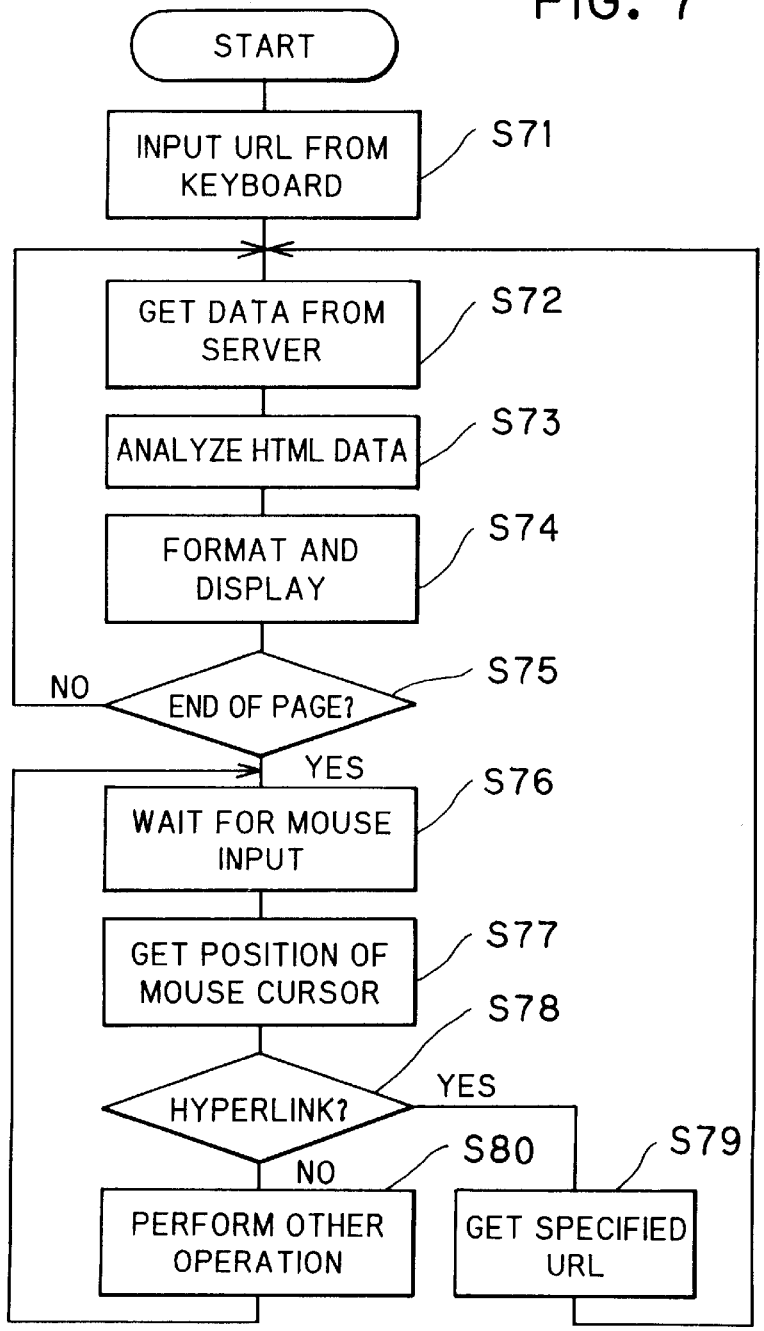
FIG. 7 is a flowchart showing the processing sequence of conventional terminals.

The process shown in FIG. 7 is similar to that executed in conventional systems not provided with history buttons 55 and 56 (see FIG. 5). The process shown in FIG. 15 and described later includes use of these history buttons 55 and 56, which are a feature of the present invention. For purposes of comparison, however, the conventional process will be described in general with reference to FIG. 7.

The user inputs the first URL via the keyboard 36 of a terminal unit 13 (step 71; hereinafter, step will be abbreviated as S). Data specified by this URL is read from server A (15) using the HTTP protocol (S72), analyzed (S73), and displayed in a window (S74). If data that must be transferred separately, such as image data, exists, that data is transferred and displayed in the window. This process is performed for all data on the HTML page (S75).

When all data for one page has been transferred (S75: yes), the process waits for input from the mouse 37 (S76). When the mouse 37 is clicked, the position of the mouse cursor at that time is extracted S77). If the position obtained coincides with a hyperlink (S78: yes), the URL corresponding to that area is extracted (S79). Returning to S72, the process for obtaining data from the server 15 is repeated.

If the position of the mouse cursor when the mouse 37 is clicked is not at a hyperlink (S78: no), then the process corresponding to that position is executed (S80), and the process returns to S76.

In this way, the WWW system functions through communication between the terminal unit 13 and server A (15). Generally, however, communication is not performed directly between the terminal unit 13 and server A (15), but through the relay server 12.

The main purpose for using the relay server 12 is to store the data in a cache to increase the apparent transfer speed. In general, the LAN 11 is faster than the WAN 14. Therefore, data is read and temporarily stored in the cache memory of the relay server 12 on the LAN 11. When accessed again, the data is transferred from the relay server 12 rather than from server A (15) on the WAN 14, improving the effective access speed.

A feature of the present embodiment is to effectively search past data by introducing a history management mechanism for data on the relay server 12. Here, the relay server 12 of the present embodiment will be described with reference to FIG. 8.

The relay server 12 includes a URL processing function 83 for processing version-assigned URLS, to be described later; a cache management function 84 for processing data in the cache; a file system processing function 85 for actually saving data; interface functions 81 and 82 for connecting to the network; and a timer function 86 for managing the time. The LAN network interface function 82 performs server operations for the terminal units 13. The WAN network interface function 81 functions as a client for the servers l5, 16, and 17 on the WAN 14.

Figure 8:
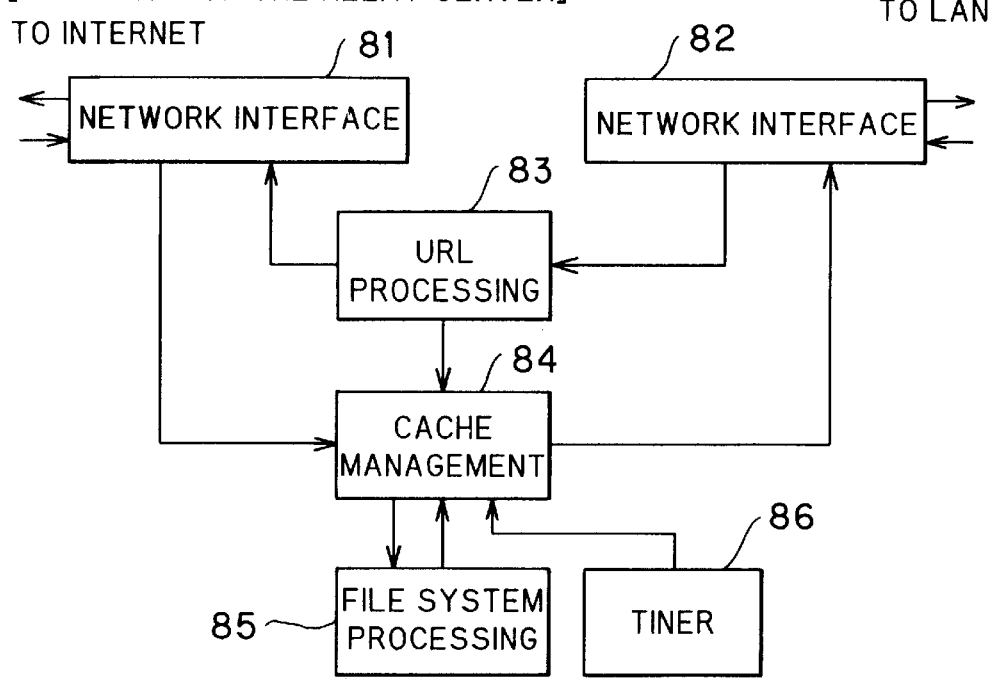
FIG. 8 is a block diagram showing the functions of relay equipment.

FIG. 8 abstractly represents the functions of the relay server 12, but the functions are performed by the components shown in FIG. 3(a). For example, the WAN network interface function 81 and LAN network interface function 82 are actually contained in the network interface 21 shown in FIG. 3(a).

Figure 9:
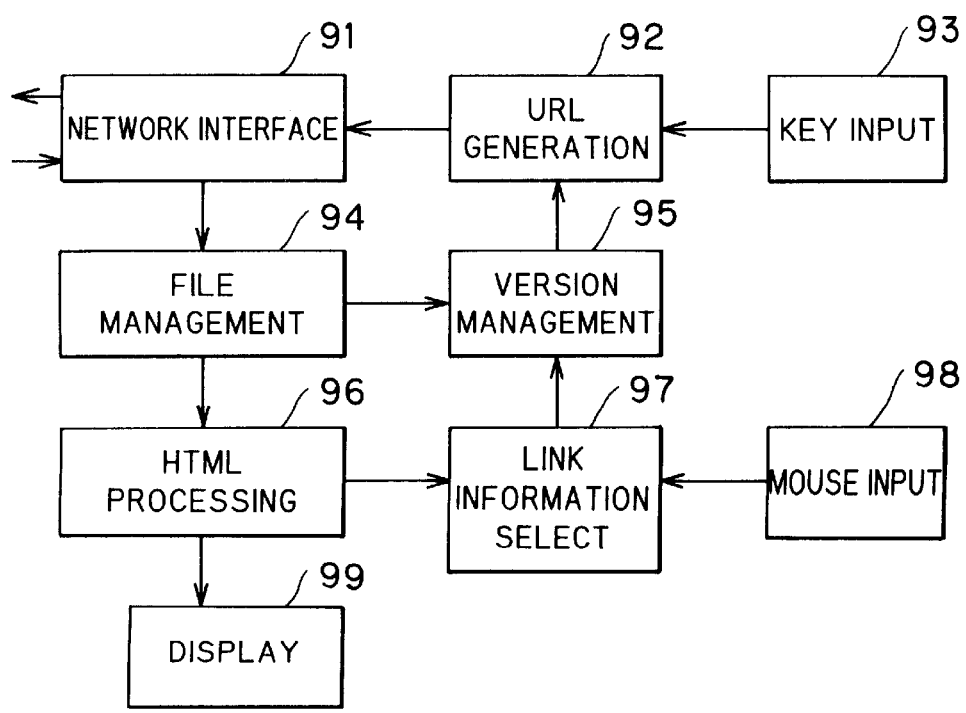
FIG. 9 is a block diagram showing the functions of terminal equipment.

The terminal units 13 also contain history functions. The terminal units 13 will be described with reference to FIG. 9.

In addition to a network interface function 91, an HTML processing function 96, a display function 99, a link Information select function 97, a URL generation function 92, key input functions 93, and a mouse input function 98, which are necessary for demonstrating conventional client functions, the terminal units 13 of the present invention include a file management function 94 and version management function 95 for processing version-assigned URLs and history-assigned data. Naturally, the history buttons 55 and 56 shown on the screen in FIG. 5 are an integral part of achieving the history functions of the present configuration.

In order to achieve these history functions, the present embodiment employs data that has been slightly expanded from ordinary URLs and date. The configuration of this data will be described next.

Figure 10:
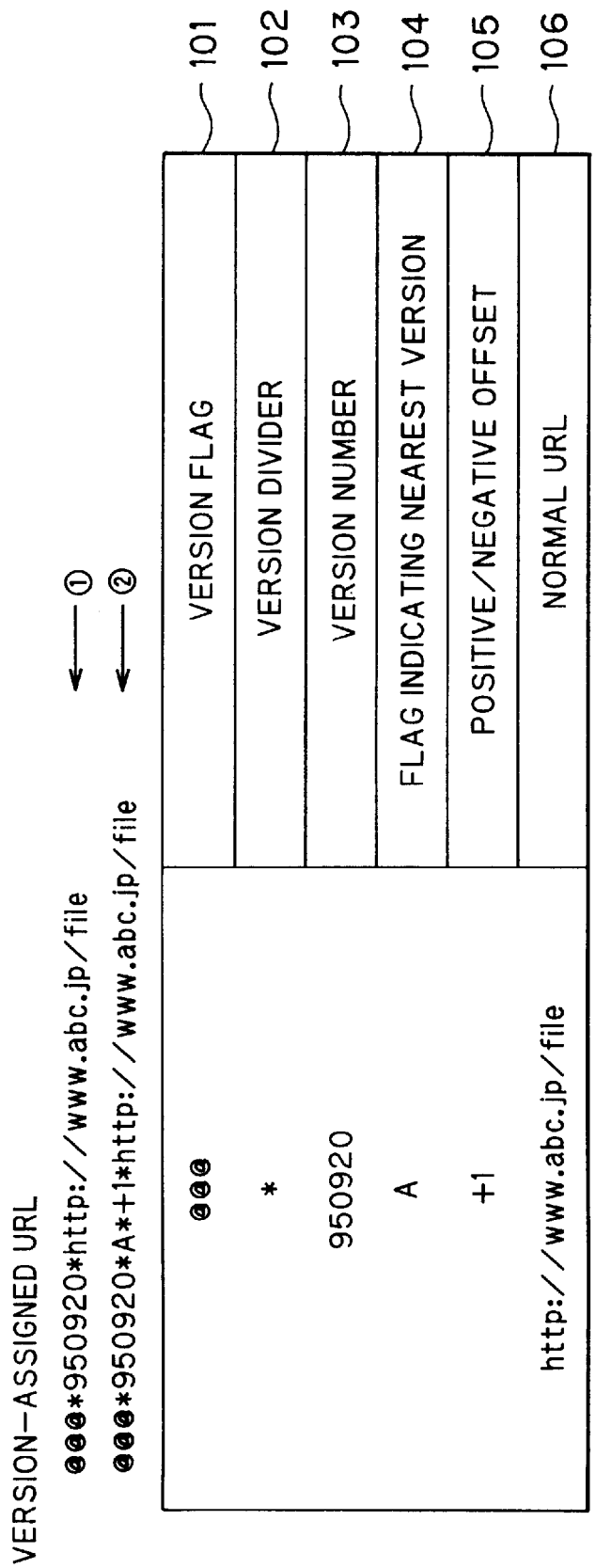
FIG. 10 is an explanatory diagram of a version-assigned URL.

Version-assigned URLs are ordinary URLs with additional data to indicate the version number. As shown in FIG. 10, version-assigned URLs include a version flag 101 to indicate whether a version has been assigned; a version divider 102, a version number 103, a flag 104 to indicate the nearest version, a positive/negative offset 105 to indicate a version relative to the specified version number, and a normal URL 106 that is used conventionally.

In the present embodiment, a date is used for the version number. For practical applications, the date would have to be more precise, as in units of seconds, but for simplicity of explanation only the date will be used in this example.

The flag 104 is used when the specified version does not exist to indicate the nearest version to the one specified.

A relative version some number of versions before or after a certain version can be specified by a "+" or "−" symbol and a number in the positive/negative offset 105.

In the example of FIG. 10, the URL pointed to by ① is version Sep. 20, 1995. The URL pointed to by ② indicates the nearest version to version Sep. 20, 1995, this nearest version being one version newer.

The format of data stored in the cache of the relay server 12 will be described next.

As shown in FIG. 11(a), cache data is stored as files, each of which has a separate name devoted to one version of a URL. A directory 111 in the file system is create according to the protocol, host name, and path name, excluding the last part of the path name. The last part of the path name is used as the file name.

The version number is then added at the end of the file name, since files having the same name could not be distinguished otherwise. An index file 112 is also created to indicate the newest file. The name for the index file 112 is created from the last part of the path name at the end of which is added "000". As shown in FIG. 11(b), a version number 114 of the latest version is stored in the index file.

The cache files 113 contain, in addition to normal data, the total number of cache files 115 and the past versions 116, as shown in FIG. 11(c). However, since the total number of cache files will be the total number at the time the cache file was created, the older file versions do not necessarily indicate the correct total number.

Next, the procedure for actually reading data and the operations of the history functions using the above components will be described.

The example shown in FIG. 12 will be used for this description. First, a link is made from file a.html 121 on server A (15) to file b.html 122 on server B (16). Then, (1) the contents of file b.html 122 are revised, and at some later point in time, (2) the contents of file a.html 121 are revised. At this point, the link that had been pointing to file b.html on server B (16) is changed to point at file c.html 123 on server C (17).

The process of reading file a.html 121 on server A (15), following a link to either server B (16) or server C (17), and reading either file b.html 122 or file c.html 123 will be described.

First, the user reads file a.html 121 on server A (15). At this time, the same conventional operations (FIG. 7) are carried out in the terminal unit 13. In addition, data is stored in the cache of the relay server 12. This procedure will be described with reference to the flowchart in FIG. 13.

When the URL is received from the terminal unit 13 (S1301), the relay server 12 determines whether that URL has an assigned version number (S1302) If the URL is a normal URL without a version assigned (S1302: no), the cache coinciding with the URL is searched (S1303). Since cache data does not exist for data that is specified for the first time (S1304: no), the file a.html 121 is read from server A (15) (S1307). The data read is written to the cache (S1309) and then transmitted to the terminal unit 13 (S1310).

Figure 14:
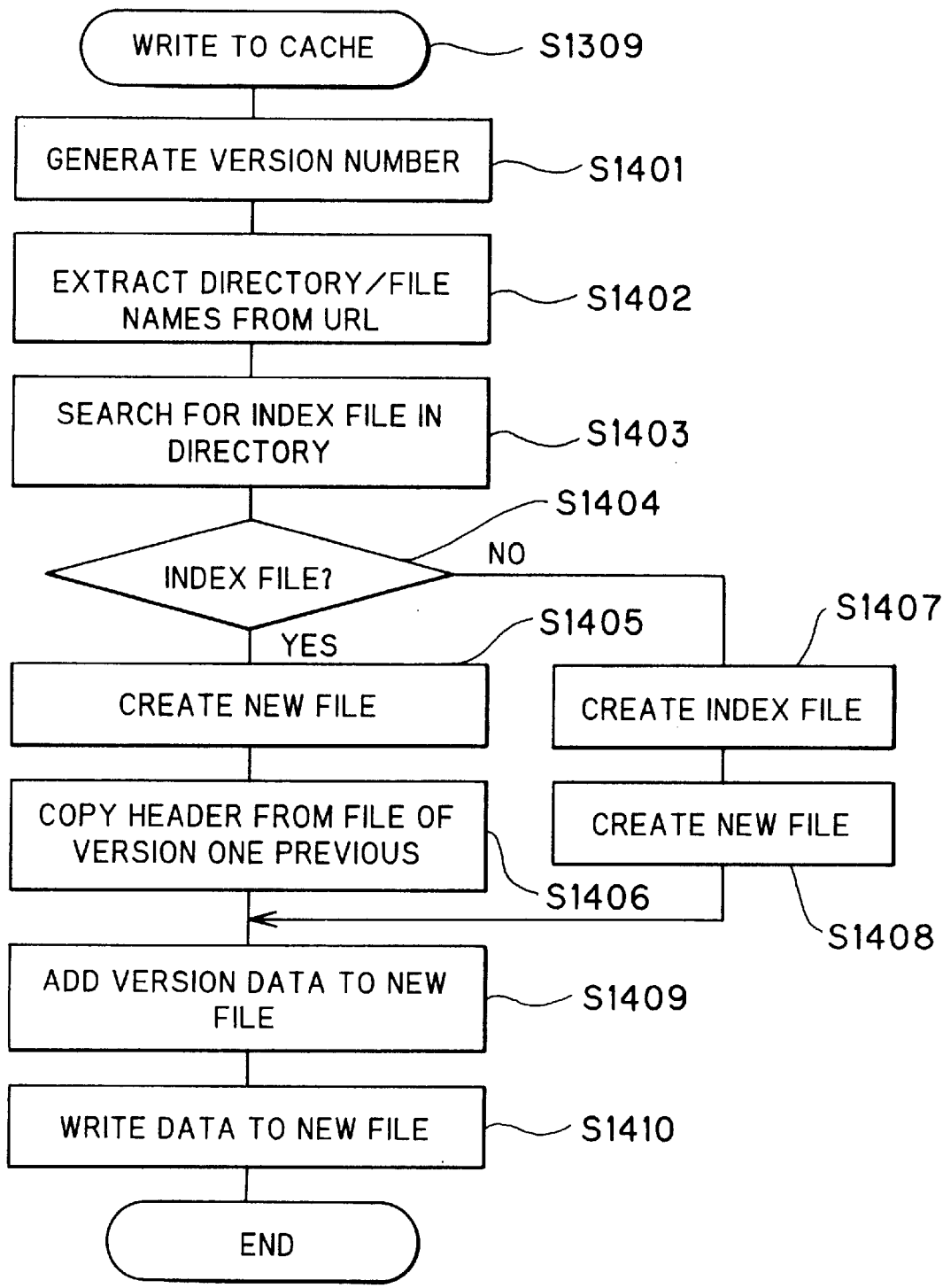
FIG. 14 is a flowchart showing the procedure for writing to the cache.

Here, the procedure in S1309 for writing data to the cache will be described with reference to the flowchart in FIG. 14.

First a version number is created (S1401). Since the current date is used for version number in the present embodiment, the date is extracted using the timer function 86 (FIG. 8).

The directory and file names are extracted from the URL (S1402). In this case, the directory is "http/A," and the file name is "a.html." A search is made for an index file within the directory (S1403). Since obviously no index file exists on the first access (S1404: no), a new index file is created in the directory (S1407). Further, a new data cache file 126 is created (S1408), as shown in FIG. 12(b). Version data is added to the data cache file 126 (S1409), and the data is written in the cache file (S1410).

If this data is accessed again, an older version of the file may exist in the cache. In this case, an index file already exists (S1404: yes), so a new data cache file is created in the directory (S1405). The header of the file one version previous to the new file is copied to the new file (S1406). Then, the new version number is added (S1409). Hence, each cache file contains all the version information from the previous files.

After relaying the file a.html 121 from server A (15) shown in FIG. 12, the user clicks with the mouse 37 on a link described in the file a.html 121 to request the file b.html 122 from server B (16). A process similar to the one just described is executed to transfer the file b.html 122 from server B (16) and write the data to the cache of the relay server 12.

After some time passes, it will be assumed that the file b.html 122 is updated, for the sake of this example. Here, the process executed when the user again follows the procedure of accessing first server A (15) and then server B (16) will be described.

Figure 13:
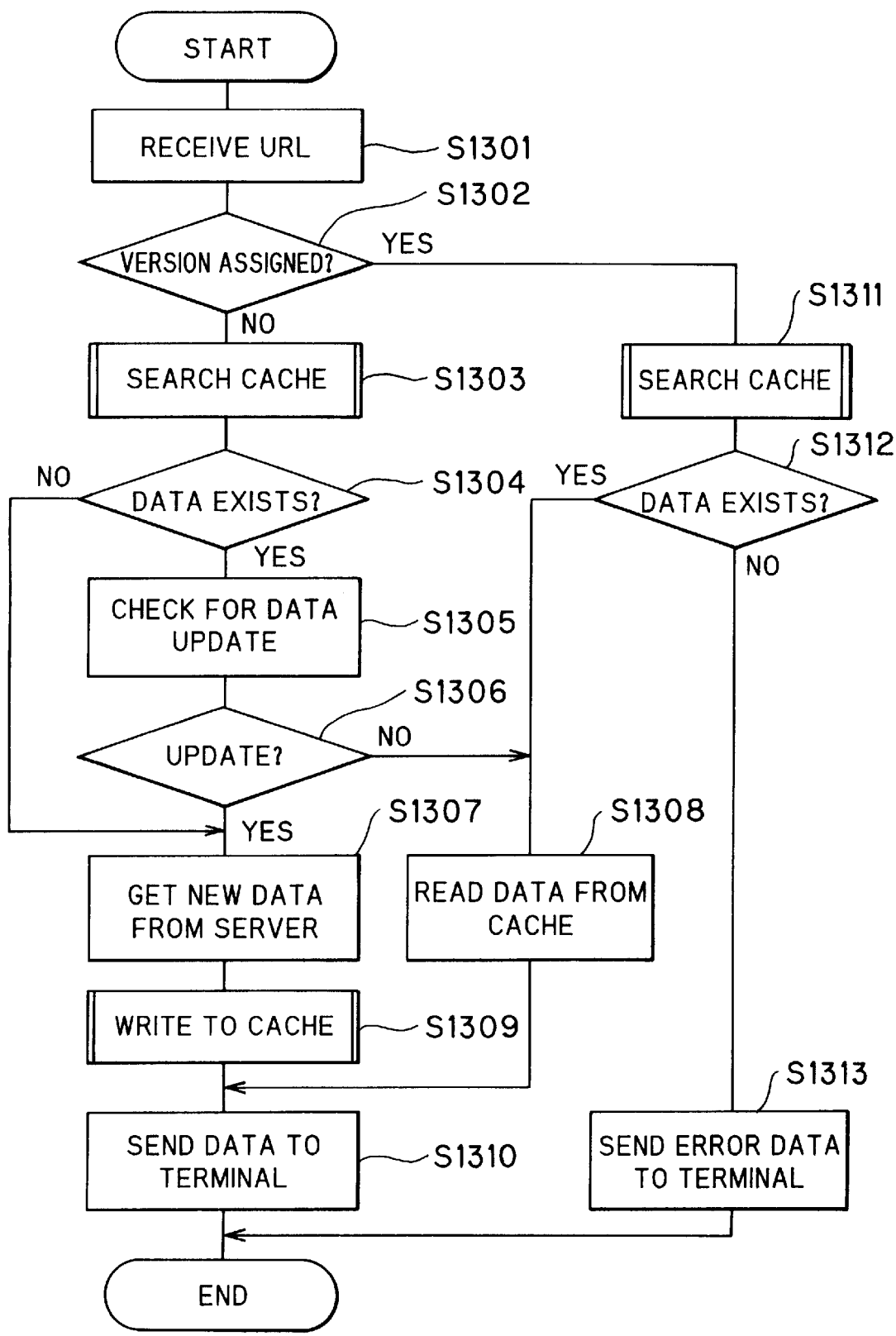
FIG. 13 is a flowchart showing the operations of relay equipment.

For this case, the cache is searched (S1303) and the data is found to exist (S1304: yes), as shown in FIG. 13. Then the data is checked to see whether it has been updated (S1305). This is accomplished by inquiring to server A (15) whether the file a.html 121 has been updated.

In this case, the data on server A (15) has not been updated (S1306: no), so the data of data cache file 126 shown in FIG. 12(b) is read (S1308) and transferred to the terminal unit 13 (S1310).

Next, the user follows a link from the file a.html 121, as described above, to request data from server B (16), and the file b.html 122 is received from server B (16) according to the procedure described above. In this case, the data has been updated (S1306: yes), so the new data is received from server B (16) (S1307). After writing the data to the cache (S1309), the data is transferred to the terminal unit 13 (S1310).

The processes described thus far have been achieved by conventional relay servers with cache functions. Here, a process for extracting past data, which is a feature of the present invention, will be described.

The screen display of the terminal units 13 in the present embodiment is shown in FIG. 5. As described above, the history buttons 55 and 56 are used to trace back through past versions to extract older data. By clicking on the left button 55, a version one earlier than the currently displayed version will be displayed. By clicking on the right button 56, a version one later than the currently displayed version will be displayed.

The operations of the terminal unit 13 and relay server 12 when using the history buttons 55 and 56 will be described using the example of the file b.html 122 on server B (16) (see FIG. 12(a)).

Figure 15:
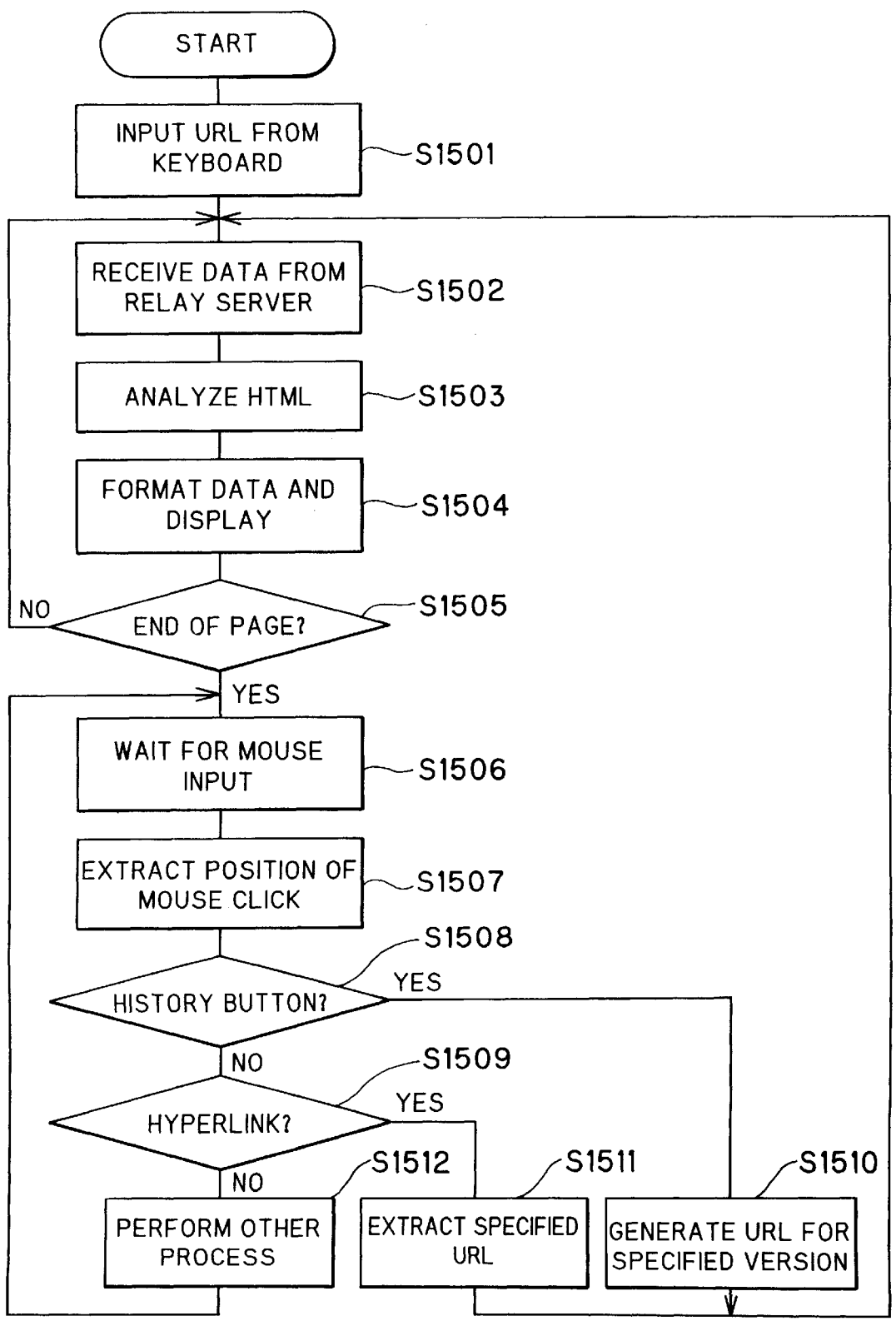
FIG. 15 is a flowchart showing the processing sequence of a terminal in the embodiment.

The flowchart shown in FIG. 15 is the same process shown in FIG. 7, except the operations related to the history functions have been added. The process from S1501–S1503 is the same as S71–S73 of FIG. 7. Next, after the entire page of file b.html 122 has been displayed on the screen of the terminal unit 13 (S1505: yes), the process waits for a mouse click (S1506).

When the user clicks on one of the history buttons 55 or 56, the position of the mouse cursor at the time of the click is input via the mouse input function 98 (see FIG. 9), and the position is extracted (S1507). If the position corresponds to one of the history buttons 55 or 56 (S1508: yes), a URL for the version indicated is generated (S1510) by adding the version number to the normal b.html data.

As described above, the data contains all version data up to the time the data cache file was created. Therefore, when changing to data one version earlier, the earlier data can be extracted according to version data in the data currently displayed. In other words, "@@@*950910*http://B/b.html." Data one version later can be specified by adding "+1" to the version number of the currently displayed data, as in "@@@*951010*+1*http://B/b.html."

Next, the terminal unit 13 transfers this URL to the relay server 12 and receives the data for the corresponding version. As shown in FIG. 13, after receiving a URL, the relay server 12 checks whether the URL has an appointed version number (S1302). In this case, the URL has a version number (S1302: yes), and the cache is searched, as a result.

The process for searching the cache in S1311 will be described next with reference to the flowchart in Fig 16.

If the URL is "@@@*950910*http://B/b.html," for example, the directory and file names are extracted from the RL (S1601). The index file is searched for in the directory (S1602). Since an index file exists in this case (S1603: yes), the version data is extracted from the newest cache file (S1604). The existence of the specified version is determined from the version data S1605). In this case, the version 950910 exists in the version data (S1605), and the process shifts to S1609.

Here, the existence of a + or − specification is determined (S1609). Since no such specification is included in this URL (S1609: no), the cache searching process ends, having determined that the data exists in the cache.

Therefore, returning to S1312 of FIG. 13, the data exists in the cache (S1312: yes), so the data is extracted from the cache (S1308) and transferred to the terminal unit 13 (S1310).

Figure 16:
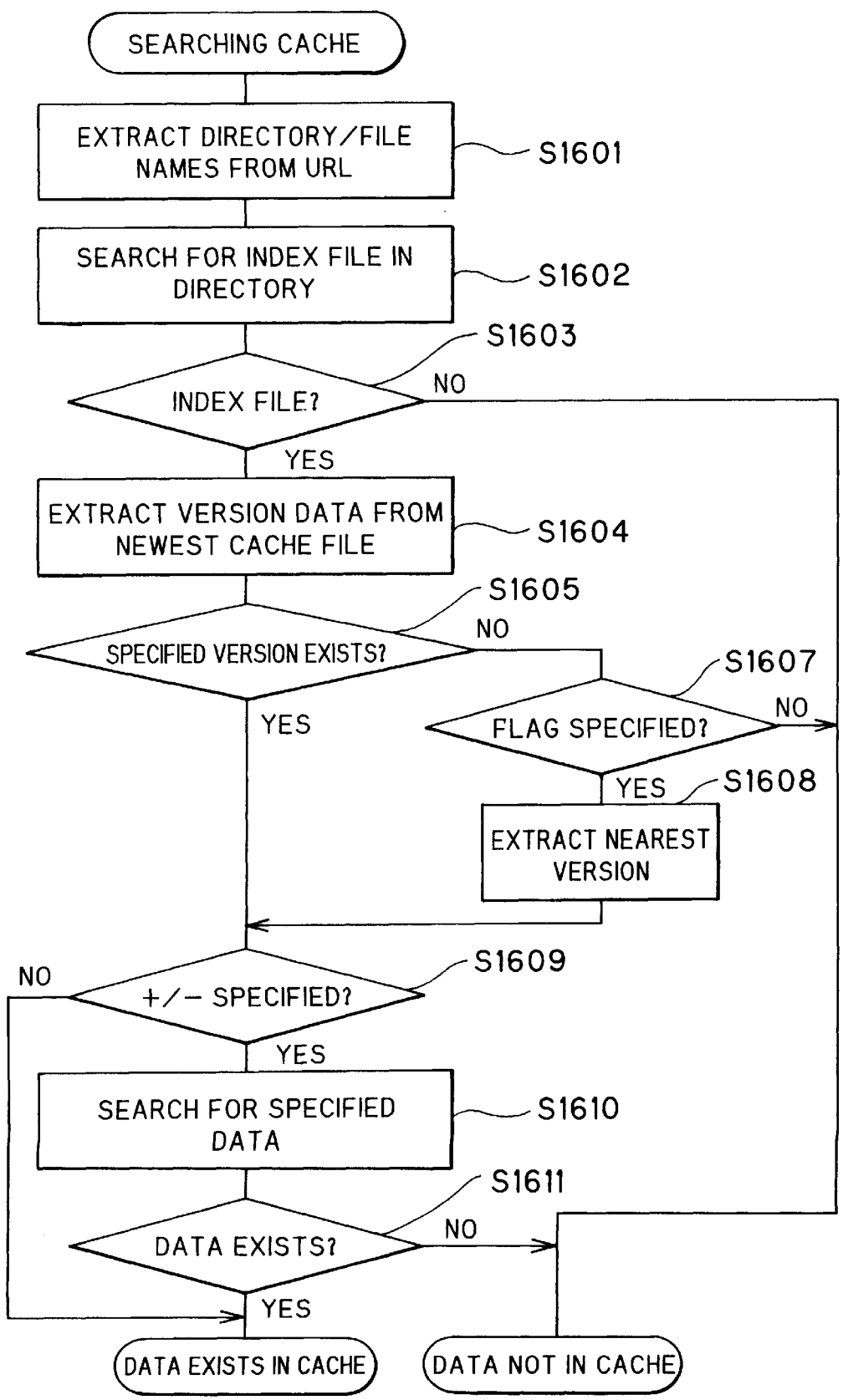
FIG. 16 is a flowchart showing a procedure for searching the cache.

However, if in the process of FIG. 16 the URL was "@@@*951010*+1*http://B/b.html," the version 951010 also exists (S1605: yes), but a plus is specified in the URL (S1609: yes). Hence, a search is performed for data one version newer than the version 951010 (S1610). However, no such data exists in the cache (S1611: no), and the cache searching process ends, having determined that the data does not exist in the cache.

Therefore, returning to S1312 of FIG. 13, since the data does not exist in the cache (S1312: no), the relay server 12 sends an error message to the terminal unit 13 signifying that no file of that version exists (S1313).

Hence, if the correct data is received from the relay server 12, the terminal unit 13 displays that data on the display unit 35 (see FIG. 3(b)), but if an error message is received, the terminal unit 13 notifies the user concerning the error.

In this way, the user can trace through past file versions to find a specific version simply by clicking the history buttons 55 and 56 with the mouse 37.

In accessing past files by specifying versions, the treatment of links is also different from the conventional method. That is, links to past data existed at a time in the past and do not necessarily exist in the present.

Figure 12A:
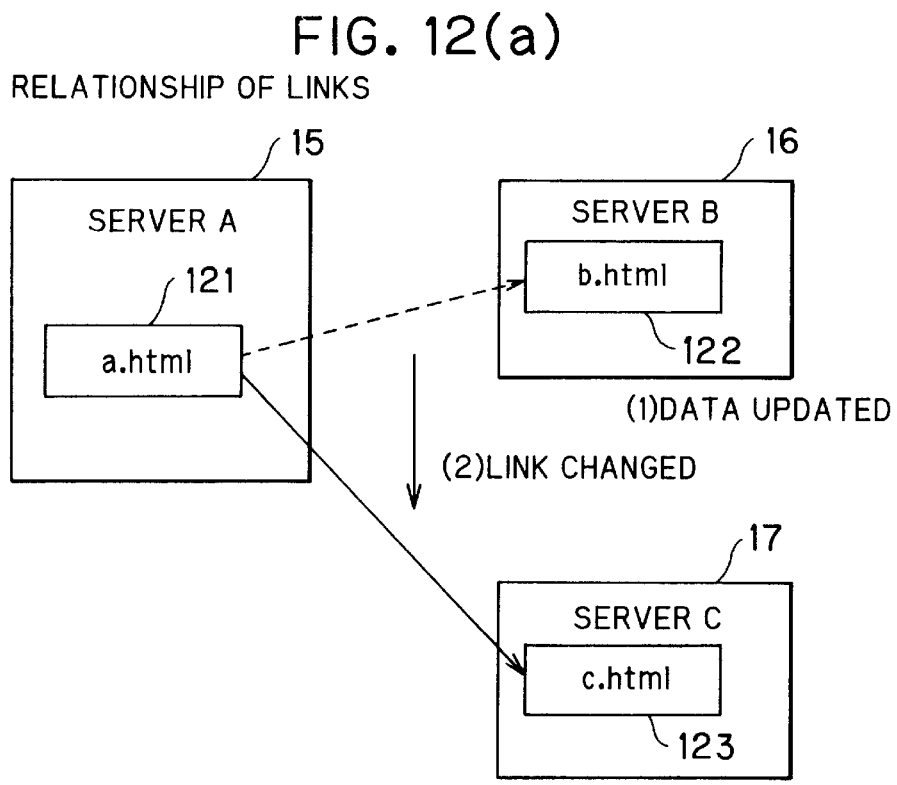
FIG. 12(a) is an explanatory diagram showing changes in data on relay servers over time.
Figure 12B:
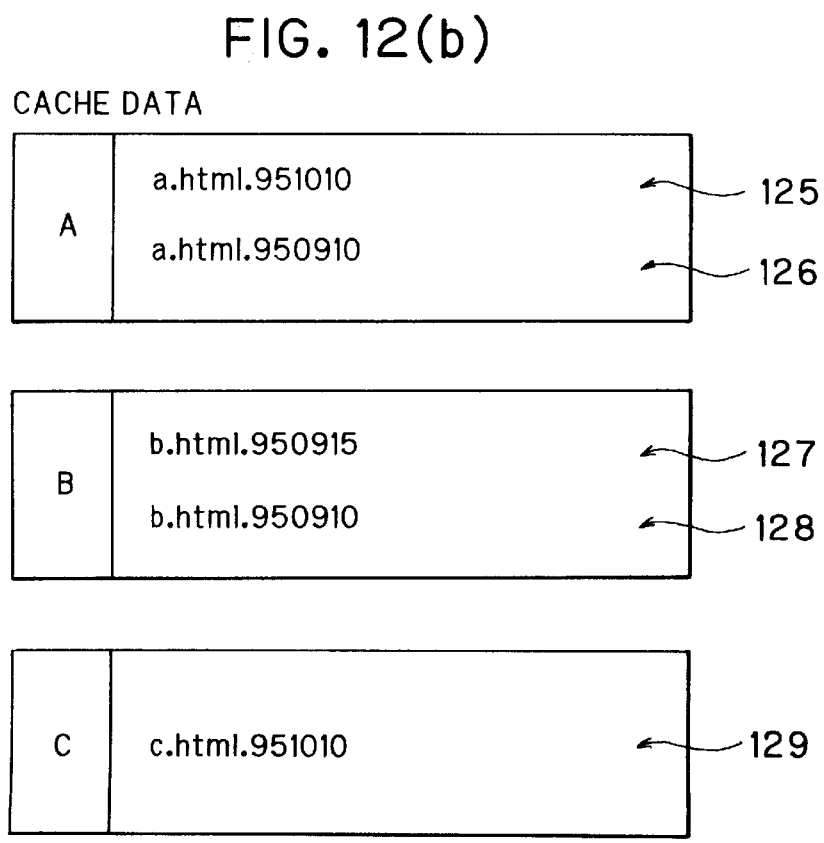
FIG. 12(b) is an explanatory diagram showing cache data in the relay server.

As one example, a link in the file a.html 121 of server A (15) is revised, as indicated in (2) of FIG. 12(a), to indicate the file c.html 123 on server C (17) instead of the file b.html 122 on server B (16).

First, a request to read the file a.html 121 is sent to server A (15) from the terminal unit 13. In this case, the file a.html 121 has been revised. Therefore, as described above, the relay server 12 receives the file a.html 121 from server A (15), stores the data in the cache, and transfers the data to the terminal unit 13.

The terminal unit 13 displays the data it receives. If the user clicks on a hyperlink, requesting the file c.html 123 from server C (17), the same procedure as described above is executed. Now, assume the user returns the display to the screen corresponding to the file a.html 121 and clicks on the history buttons 55 to request the previous version. As described above, the previous version of the file a.html 121 is received and displayed.

Now assume the user clicks on a hyperlink in this previous version, requesting the file b.html 122 from server B (16). In the terminal unit 13, a URL is generated by adding the flag 104 (see FIG. 10) specifying the nearest version to the version of the file a.html 121. In other words, a request for "@@@*950910*A*http://B/b.html" is sent to the relay server 12. The flag 104 is used because the version of the file a.html 121 does not perfectly agree with the version of the file b.html 122. If the flag 104 is not added, the corresponding version cannot be retrieved.

When receiving a URL containing a flag 104, the relay server 12 searches the cache in the same way as described above. This process is the same as the process for searching the cache without a flag 104, as described in S1601–S1604 of FIG. 16, including searching for the index file according to the file and directory names and extracting the version number from the most recent file.

However, if a file for the specified version does not exist (S1605: no) and a flag 104 has been included (S1607: yes) the nearest version is extracted (S1608). Here, the nearest version is the cache file that contains a version number closest to the version number specified.

In this way, the file b.html 122, which is the nearest version to the older file a.html 121, is extracted from the cache and transferred to the terminal unit 13.

If the file is frequently updated, the data extracted based on the link from the file a.html 121 will not always be the same as the one previously accessed. However, the user can easily go back or forth several versions using the history buttons 55 and 56 in order to find the desired version.

While only one exemplary embodiment of this invention has been described in detail, those skilled in the art will recognize that there are many possible modifications and variations which may be may in this exemplary embodiment while yet retaining many of the novel features and advantages of the invention. Accordingly, all such modifications and variations are intended to be included within the scope of the appended claims.

For example, as described in the above embodiment, the information terminal unit with history management functions was configured with the relay server 12 and any one of the terminal units 13, as shown in FIG. 2, but this information terminal unit could be configured as one unit performing the functions of both. However, in the configuration described in the embodiment, a plurality of terminal units 13 can use the history management functions and memory functions in the relay server 12, which is advantageous in conserving memory capacity, Further, in the embodiment described above, versions were specified by clicking on the history buttons 55 and 56 using the mouse 37, but versions could be specified by clearly entering version-assigned URLs via the keyboard 36 (see FIG. 3(b)). Also, since data for past versions is stored in cache files, these files could be displayed on the display unit 35 in a menu format, allowing the user to select a specific version.

Further, when the contents of the cache files are changed, the changes usually pertain to only one portion of the data. Therefore, rather than storing the entire data for each version, only the portion differing from a past version could be extracted and stored in the cache, allowing the memory capacity of the disk 24, shown in FIG. 3(a) to be reduced.

What is claimed is:

1. An information management terminal unit connectable to a system wherein a plurality of information providing means are connected to one another via a network, thereby configuring a distributed database system, the information management terminal unit comprising:

communicating means for communicating with the plurality of information providing means via the network and acquiring contents data from at least one of the plurality of information providing means, the contents data being identified by a URL;

storing means for storing the URL and contents data acquired from the at least one of the plurality of information providing means;

history management means for generating history information on the contents data stored in the storing means to manage the contents data on a time basis;

specifying means for specifying the contents data based on the history information:

screen generating means for generating screen information based on the contents data specified by the specifying means;

displaying means for displaying an image screen based on the screen information generated by the screen generating means;

input means for inputting a data name, the data name being inputted by an operator on a needed basis;

determination means for determining whether or not contents data identified by the data name is stored in the storing means; and investigating means for investigating whether or not the contents data identified by the data name is updated in one of the plurality of information providing means from which the contents data stored in the storing means has been downloaded, wherein the communication means acquires updated contents data when the contents data is updated in the one of the plurality of information providing means.

2. The information management terminal unit according to claim 1, wherein the history information generated by the history management means includes coded information relating to the contents data, the coded information identifying the at least one of the plurality of information providing means from which the contents data is acquired.

3. The information terminal unit according to claim 1, wherein plural sets of screen generating means, displaying means, and the history specifying means are provided to one set of the history management means and the storing means.

4. A method of acquiring data from a plurality of information providers connected to one another via a network, comprising the steps of:

entering a uniform resource locator from one of a plurality of information terminal units connectable to the network to acquire contents data identified by the uniform resource locator from one of the plurality of information providers, the uniform resource locator including a directory name and a file name;

assigning the contents data with a version of the contents data;

storing the contents data with the file name of the uniform resource locator and the version of the contents data in a corresponding directory of a cache memory, the corresponding directory having the same name as the directory name of the uniform resource locator:

transferring the contents data from the corresponding directory of the cache memory to any one of the plurality of information terminal units which searches for the contents data if the contents data is stored in the corresponding directory; and displaying the contents data transferred from the corresponding directory in a display unit provided in association with the any one of the plurality of information terminal units.

5. The method according to claim 4, further including the step of assigning the uniform resource locator with the version of the corresponding contents data.

6. The method according to claim 5, further including the step of adding a flag to the file name, the flag indicating that the version of the data is assigned to the corresponding contents data.

7. The method according to claim 5, wherein the version of the contents data is assigned by a number corresponding to year/month/date when the uniform resource locator is entered.

8. The method according to claim 5, further comprising the steps of:

investigating whether or not the contents data identified by the uniform resource locator has been updated in the one of the plurality of information providers from which the contents data stored in the corresponding directory has been downloaded when the uniform resource locator is later entered from any one of the plurality of information terminal units;

when the contents data identified by the uniform resource locator has not been updated, transferring the contents data from the corresponding directory to the any one of the plurality of information terminal units; and when the contents data identified by the uniform resource locator has been updated, acquiring updated contents data from the one of the plurality of information providers, assigning the updated contents data with a new version of the contents data, and storing the updated contents data, the newer version of the contents data and the file name in the corresponding directory of the cache memory.

9. The method according to claim 8, further comprising the step of entering the file name with a desired version of the contents data when the contents data corresponding to the desired version is to be displayed in the display unit.

10. The method according to claim 4, wherein the contents data contains another uniform resource locator identifying correlated contents data, the another uniform resource locator including another directory name and another file name, and further comprising the steps of:

entering the another uniform resource locator from the one of the plurality of information terminal units to acquire the correlated contents data identified by the another uniform resource locator from one of the plurality of information providers;

assigning the correlated contents data with another version of the correlated contents data;

storing the correlated contents data, the another version of the correlated contents data, and the another file name in a corresponding directory of the cache memory;

transferring the correlated contents data from the corresponding directory of the cache memory to any one of the plurality of information terminal units which searches for the correlated contents data if the correlated contents data is stored in the directory; and displaying the correlated contents data in the display unit provided in association with the any one of the plurality of information terminal units.

11. The method according to claim 10, wherein the information terminal unit is connected to a local area network, and the plurality of information providers are connected to a wide area network, the local area network being connected to the wide area network.

12. The method according to claim 11, wherein a relay server is connected to the local area network and the cache memory is provided in the relay server, the relay server acting as a server with respect to the information terminal unit on the local area network and as a client with respect to the plurality of information providers on the wide area network.

* * * * *